US006703932B2

(12) United States Patent
Matsuzawa

(10) Patent No.: US 6,703,932 B2
(45) Date of Patent: Mar. 9, 2004

(54) INTRUSION DETECTION AND WARNING SYSTEM

(75) Inventor: Kazuhiko Matsuzawa, Tokyo (JP)

(73) Assignee: Iwata Electric Co., Ltd., Tokyo (JP)

( * ) Notice: Subject to any disclaimer, the term of this patent is extended or adjusted under 35 U.S.C. 154(b) by 0 days.

(21) Appl. No.: 10/092,251

(22) Filed: Mar. 7, 2002

(65) Prior Publication Data

US 2003/0020609 A1 Jan. 30, 2003

(30) Foreign Application Priority Data

Jul. 25, 2001 (JP) ....................................... 2001-223780

(51) Int. Cl.[7] ......................... G08B 13/08; G08B 21/00; G08B 13/00; G01S 15/00

(52) U.S. Cl. .................... 340/545.3; 340/540; 340/565; 340/566; 367/93; 367/94

(58) Field of Search ......................... 340/541, 565–566, 340/540, 545.3; 367/93, 94

(56) References Cited

U.S. PATENT DOCUMENTS 4,054,867 A * 10/1977 Owens ....................... 340/550
4,072,936 A * 2/1978 Spirig ........................ 340/566
5,084,696 A * 1/1992 Guscott et al. ............. 340/541
5,450,061 A * 9/1995 McMaster .................... 340/550
5,457,353 A * 10/1995 Thurn et al. ................ 310/334

FOREIGN PATENT DOCUMENTS

GB 2143976 A * 2/1985 ........... G08B/13/04

* cited by examiner

*Primary Examiner*—Jeffery Hofsass
*Assistant Examiner*—Lam Pham
(74) *Attorney, Agent, or Firm*—Michael D. Bednarek; Shaw Pittman LLP

(57) ABSTRACT

A warning system comprises a piezo-electric ceramic capable of resonating with an ultrasonic wave having a frequency within a predetermined frequency band and thus outputting an electric signal, a resonator capable of detecting only a signal component having a specific frequency from the electric signal output from the piezo-electric ceramic. When the resonator has detected a signal component having a specific frequency, an alarm signal is continuously generated for a predetermined time set by a timer, so that a warning notice is produced by an alarm device in accordance with the alarm signal.

19 Claims, 3 Drawing Sheets

INTRUSION DETECTION AND WARNING SYSTEM

BACKGROUND OF THE INVENTION

1. Field of the Invention

The present invention relates to a warning system, particularly to a warning system which is capable of detecting a thief who breaks a house window and intrudes into the house and which produces an alarm. This invention also relates to an alarm signal generation device forming the warning system.

2. Description of the Related Art

In order to deal with a theft in which a thief breaks a house window and then intrudes into the house, there have been suggested various types of warning systems. A typical example for a warning system is formed by attaching an impact sensor to a window or to a window frame, in a manner such that when the window is broken and an impact is thus caused to the window, the impact sensor will send out a signal which will be received by an alarm device so that the alarm device can produce a warning notice.

However, the above-described conventional warning system is so formed that its impact sensor will respond not only to an impact caused by a thief breaking the window, but also to a window vibration caused due to rain and/or wind, as well as to the vibration of the window caused due to noise close to the house. As a result, it is difficult to avoid an inconvenience in which a warning notice will be undesirably produced even when it is not necessary.

SUMMARY OF THE INVENTION

It is an object of the present invention to provide an improved warning system and an improved alarm signal output device, capable of distinguishing a real theft from a window vibration caused due to other reasons, thereby correctly detecting a theft and thus correctly producing a warning notice.

A warning system constructed according to the present invention comprises an electric signal output device capable of resonating with an ultrasonic wave having a frequency within a predetermined frequency band and thus outputting an electric signal; a signal detection device capable of detecting only a signal component having a specific frequency from the electric signal output from the electric signal output device; an alarm signal output device capable of outputting an alarm signal in accordance with the detection of the signal component having the specific frequency, said detection being carried out by the signal detection device; and a warning notice producing device capable of producing a waring notice in accordance with an alarm signal fed from the alarm signal output device.

The aforementioned warning system can be put into practical use by for example attaching the electric signal output device to a window, so that as soon as an invader breaks a window and thus an impact is caused to the window, the electric signal output device will resonate with an ultrasonic wave having a frequency within a predetermined specific frequency band and mixed with other ultrasonic waves caused due to the above impact, thereby producing an electric signal. In this way, only a signal component having a specific frequency can be detected from the electric signal, by means of the signal detection device. Therefore, the alarm signal output device can operate to output an alarm signal based on the detected signal component having a specific frequency. As a result, a warning notice can be produced by the warning notice producing device in accordance with the alarm signal.

Accordingly, with the use of the aforementioned warning system, it is possible to catch and distinguish an impact caused by an intruder to the window, from other sorts of impacts caused by other factors such as rain and/or wind, thereby generating an automatic and correct production of a warning notice at a time the window has been truly broken.

Here, as the electric signal output device, it is possible to use a piezo-electric element or a piezo-electric material. In particular, it is preferred that a piezo-electric ceramic be used. Further, as the signal detection device, it is possible to use a resonator such as an LC resonator. Moreover, as a warning notice to be produced by the warning notice producing device, it is possible to employ a warning notice which is in the form of sound or light.

In addition, in a preferred embodiment of the present invention, the warning system may be so formed that its signal detection device can operate to detect, as a single component having a specific frequency, an ultrasonic wave signal generated immediately before the breaking of a window. In this way, it is possible to correctly distinguish, from other sorts of signals, an ultrasonic wave signal which has a specific frequency and caused due to the breakage of the window.

In another preferred embodiment of the present invention, the warning system is so formed that it is possible to provide a semiconductor switch which receives an output of the signal detection device and then starts the alarm signal output device. In this way, it is possible to carry out a high precision On/Off control of the output of the alarm signal during a predetermined time period.

A warning system according to a further embodiment of the present invention comprises an electric signal output device capable of resonating with an ultrasonic wave having a frequency within a predetermined frequency band and thus outputting an electric signal; a signal detection device capable of detecting only a signal component having a specific frequency from the electric signal output from the electric signal output device; an alarm signal output device capable of outputting, for a predetermined time period, an alarm signal in accordance with the detection of the signal component having the specific frequency, said detection being carried out by the signal detection device; and a warning notice producing device capable of producing a warning notice in accordance with an alarm signal fed from the alarm signal output device.

Further, an alarm signal output device of the present invention comprises an electric signal output device capable of resonating with an ultrasonic wave having a frequency within a predetermined frequency band and thus outputting an electric signal; a signal detection device capable of detecting only a signal component having a specific frequency from the electric signal output from the electric signal output device; an alarm signal output device capable of outputting an alarm signal in accordance with the detection of the signal component having the specific frequency, said detection being carried out by the signal detection device.

DESCRIPTION OF THE PREFERRED EMBODIMENTS

Figure 1:
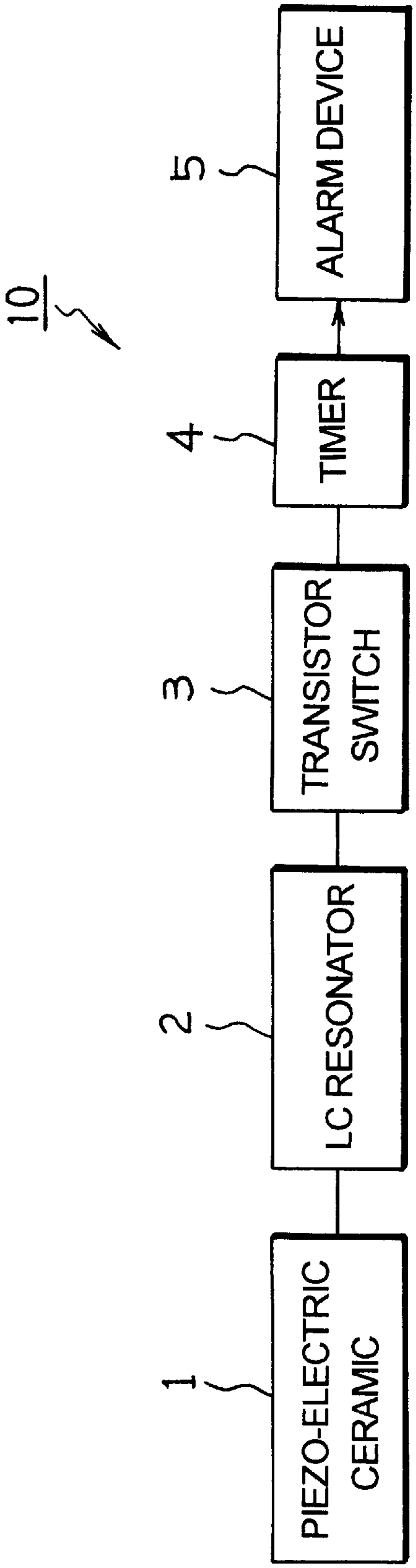
FIG. 1 is a block diagram showing a warning system formed according to one embodiment of the present invention.

Referring to FIG. 1, a warning system 10 formed according to an embodiment of the present invention includes a piezo-electric ceramic 1 serving as an electric signal output means, a resonator (LC resonator) 2 serving as a signal detection means, a transistor switch 3, a timer 4 serving as an alarm signal output means, and an alarm device 5 serving as a warning notice producing means, which are successively and electrically connected in the warning system in a manner as shown in the block diagram.

Figure 2:
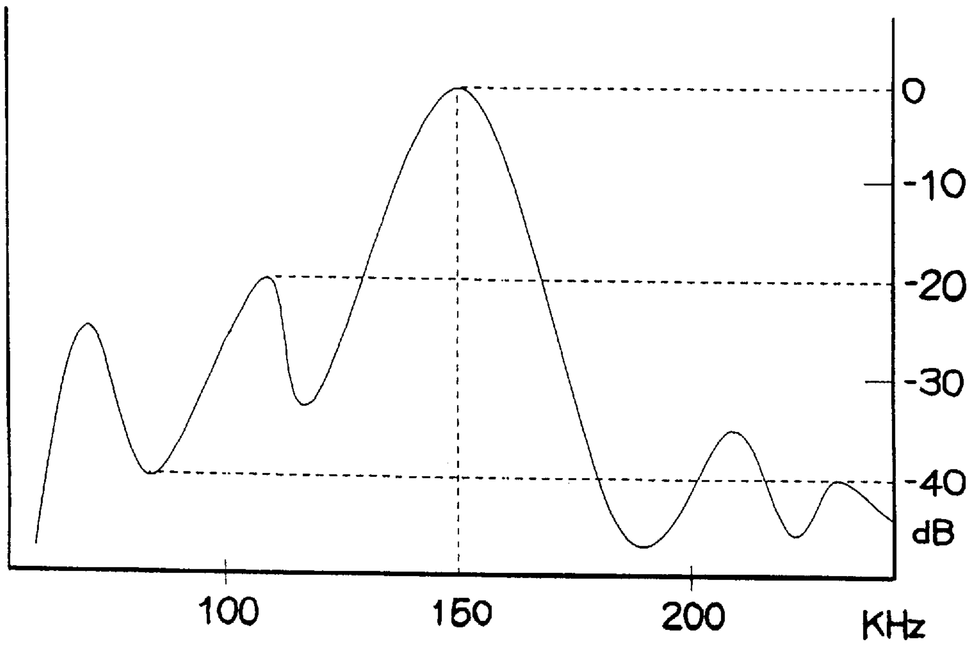
FIG. 2 is a graph showing the frequency characteristic of a piezo-electric ceramic used in the warning system shown in FIG. 1.

The piezo-electric ceramic 1 is provided to resonate with an ultrasonic wave having a frequency within a predetermined frequency band, such as an ultrasonic wave having a frequency of 150 kHz, thereby producing an electric signal. In practice, the piezo-electric ceramic 1 is attached to a house window by means of an adhesive agent. The ultrasonic wave is generated immediately before the window is broken (damaged), and there is a possibility that other ultrasonic waves will also be generated which are those not including the ultrasonic wave caused by the breaking of the window. In fact, the piezo-electric ceramic has a sensitivity which is effective not only for a specific resonance point, but rather for a relative large range, as shown in FIG. 2.

Figure 3:
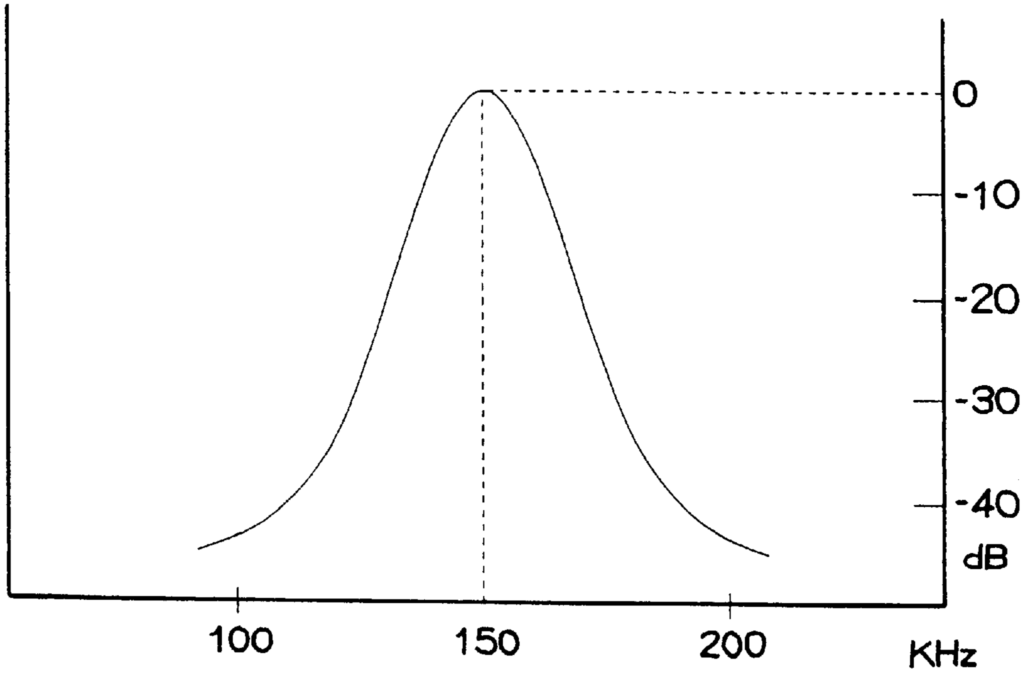
FIG. 3 is a graph showing the frequency characteristic of an LC resonator used in the warning system shown in FIG. 1.

The LC resonator connected with the piezo-electric ceramic 1 is provided to remove noise components which are of course undesired, and to detect a specific and desired component from the predetermined frequency band. With the use of the LC resonator 2, it is possible to obtain a high Q factor, as shown in FIG. 3. For example, it is possible to increase the output level of a desired ultrasonic wave having a frequency of about 150 kHz, and at the same time to effect an impedance which matches itself with the piezo-electric ceramic 1. In this way, it is not necessary to specifically prepare an amplifier for amplifying an ultrasonic wave signal detected, thereby making it possible to control the consumption of electric power to its minimum level. For example, if electric power for use in the warning system is a coin type lithium battery which is small in size and cheap in price, it is possible that the ultrasonic wave detection may be continued for about two years.

Preferably, the above-described LC resonator is a device capable of detecting, as a signal component having the aforementioned specific frequency, an ultrasonic wave signal generated immediately before a window is broken. In this way, since it is possible to correctly recognize, as distinguished from other signals, only the specific ultrasonic wave signal generated due to the breakage of the window glass, it is possible to ensure an improved detection precision for the warning system.

The transistor switch 3 connected with the LC resonator 2 and serving as a semiconductor switch, will be ON when the output level of an ultrasonic wave detected by the LC resonator 2 becomes higher than a predetermined level, thereby starting the timer 4 which is connected with the transistor switch 3. Upon turning the transistor switch 3 on, the timer 4 will operate to continuously produce an alarm signal for a predetermined time period, such as 30 seconds. Then, the alarm device 5 connected with the timer 4 will be driven in accordance with the alarm signal, thereby producing a warning notice.

The alarm device 5 may be one which is capable of producing a warning notice in the form of sound or light. In fact, such a warning notice may be in one of any other forms, provided that it can surprise a thief so as to stop the theft activity. However, a warning notice in the form of light may be a flashing type.

Now, the warning system of the present invention may be operated in the following manner. Namely, when a thief tries to break a house window in order to invade into the house, the piezo-electric ceramic 1 will operate to detect an ultrasonic wave signal (generated immediately before the window glass is broken by the thief) having a wavelength in the vicinity of 150 kHz, and convert the ultrasonic wave signal into an electric signal. Then, the LC resonator 2 operates to detect only the desired signal component (having a frequency of 150 kHz) from the electric signal. When the signal component (having the specific frequency) detected by the LC resonator is larger than a predetermined level, the transistor switch 3 will become ON, so that an alarm signal may be output from the timer 4. Subsequently, the alarm device 5 is caused to operate for only a predetermined time period (such as 30 seconds) set by the timer 4, with the operation being performed in accordance with the alarm signal. In this way, since the alarm device 5 can produce a loud sound and/or cause a lamp to flash or light up, it is possible to quickly allow surrounding people to know that the window has been broken, thereby promptly driving away the thief.

With the use of the warning system 10 formed according to the above embodiment of the present invention, since only an ultrasonic wave having a specific frequency corresponding to window breakage is detected automatically so as to produce a warning notice, it is possible to avoid a mistaken warning notice undesirably produced due to the detection of a window glass vibration caused by rain and/or wind.

What is claimed is:

1. An intrusion and warning system comprising:

electric signal output means capable of resonating with an ultrasonic wave having a frequency within a predetermined frequency band and thus outputting an electric signal;

signal detection means capable of detecting only a signal component having a specific frequency from the electric signal output from the electric signal output means, wherein the signal detection means is configured to increase output level of a desired ultrasonic wave and to effect an impedance which matches itself with the electric signal output means;

alarm signal output means capable of outputting an alarm signal in accordance with the detection of the signal component having the specific frequency, said detection being carried out by the signal detection means; and warning notice producing means capable of producing a warning notice in accordance with an alarm signal fed from the alarm signal output means.

2. The intrusion and warning system according to claim 1, wherein the electric signal output means is a piezo-electric element.

3. The intrusion and warning system according to claim 1, wherein the signal detection means is a resonator.

4. The intrusion and warning system according to claim 1, wherein the signal detection means is provided to detect, as a signal component having a specific frequency, an ultrasonic wave signal generated immediately before a window is broken.

5. The intrusion and warning system according to claim 1, further comprising a semiconductor switch for receiving an output from the signal detection means and for starting the alarm signal output means.

6. An intrusion and warning system comprising:

electric signal output means capable of resonating with an ultrasonic wave having a frequency within a predetermined frequency band and thus outputting an electric signal;

signal detection means capable of detecting only a signal component having a specific frequency from the electric signal output from the electric signal output means, wherein the signal detection means is configured to increase output level of a desired ultrasonic wave and to effect an impedance which matches itself with the electric signal output means;

alarm signal output means capable of outputting, for a predetermined time period, an alarm signal in accordance with the detection of the signal component having the specific frequency, said detection being carried out by the signal detection means; and warning notice producing means capable of producing a warning notice in accordance with an alarm signal fed from the alarm signal output means.

7. The intrusion and warning system according to claim 6, wherein the electric signal output means is a piezo-electric element.

8. The intrusion and warning system according to claim 6, wherein the signal detection means is a resonator.

9. The intrusion and warning system according to claim 6, wherein the alarm signal output means is a timer.

10. The intrusion and warning system according to claim 8, wherein the resonator is provided to detect, as a signal component having a specific frequency, an ultrasonic wave signal generated immediately before a window is broken.

11. The intrusion and warning system according to claim 6, further comprising a semiconductor switch which receives an output of the signal detection means and then starts the alarm signal output means.

12. An alarm signal output device comprising:

electric signal output means capable of resonating with an ultrasonic wave having a frequency within a predetermined frequency band and thus outputting an electric signal;

signal detection means capable of detecting only a signal component having a specific frequency from the electric signal output from the electric signal output means, wherein the signal detection means is configured to increase output level of a desired ultrasonic wave and to effect an impedance which matches itself with the electric signal output means; and alarm signal output means capable of outputting an alarm signal in accordance with the detection of the signal component having the specific frequency, said detection being carried out by the signal detection means.

13. The alarm signal output device according to claim 12, wherein the electric signal output means is a piezo-electric element.

14. The alarm signal output device according to claim 12, wherein the signal detection means is a resonator.

15. The alarm signal output device according to claim 12, wherein the signal detection means is provided to detect, as a signal component having a specific frequency, an ultrasonic wave signal generated immediately before a window is broken.

16. The alarm signal output device according to claim 12, further comprising a semiconductor switch which receives an output of the signal detection means and then starts the alarm signal output means.

17. The alarm signal output device according to claim 12, wherein the desired ultrasonic wave has a frequency of about 150 kHz.

18. The intrusion and warning system according to claim 6, wherein the desired ultrasonic wave has a frequency of about 150 kHz.

19. The intrusion and warning system according to claim 1, wherein the desired ultrasonic wave has a frequency of about 150 kHz.

* * * * *